(12) United States Patent
Picciolo et al.

(10) Patent No.: US 7,167,884 B2
(45) Date of Patent: Jan. 23, 2007

(54) MULTISTAGE MEDIAN CASCADED CANCELLER

(75) Inventors: Michael Picciolo, Silver Spring, MD (US); Karl R. Gerlach, Dunkirk, MD (US); Jay S. Goldstein, Centreville, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 777 days.

(21) Appl. No.: 10/126,663

(22) Filed: Apr. 22, 2002

(65) Prior Publication Data

US 2003/0198340 A1   Oct. 23, 2003

(51) Int. Cl.
*G06F 17/10*   (2006.01)

(52) U.S. Cl. .................................................. 708/322

(58) Field of Classification Search ......... 708/300–323
See application file for complete search history.

(56) References Cited

U.S. PATENT DOCUMENTS

| | | | |
|---|---|---|---|
| 3,876,947 A | 4/1975 | Giraudon | |
| 4,173,759 A | 11/1979 | Bakhru | |
| 4,353,119 A | 10/1982 | Daniel et al. | |
| 4,513,383 A | 4/1985 | Hackett, Jr. | |
| 4,628,320 A | 12/1986 | Downie | |
| 4,649,505 A * | 3/1987 | Zinser et al. | 708/322 |
| 4,719,466 A | 1/1988 | Farina et al. | |
| 4,797,807 A | 1/1989 | Gerlach | |
| H792 H | 6/1990 | Sanval et al. | |
| 4,959,653 A | 9/1990 | Ganz | |
| H1005 H | 12/1991 | Gerlach | |
| H1033 H | 3/1992 | Willey et al. | |
| 5,265,065 A | 11/1993 | Turtle | |
| 5,267,266 A * | 11/1993 | Chen | 708/323 |
| 5,390,364 A * | 2/1995 | Webster et al. | 708/323 |
| 5,511,423 A | 4/1996 | Sugiyama et al. | |
| 5,541,520 A | 7/1996 | Zai et al. | |
| 5,541,867 A * | 7/1996 | Corry et al. | 708/322 |

(Continued)

OTHER PUBLICATIONS

Deerwester et al, "Indexing by Latent Semantic Analysis," J. Soc. for Information Science, 41 (6), pp. 391-407, Oct. 1990.

(Continued)

*Primary Examiner*—Kakali Chaki
*Assistant Examiner*—Chat C. Do
(74) *Attorney, Agent, or Firm*—John J. Karasek; L. George Legg

(57) ABSTRACT

An adaptive signal processing system utilizes a Multistage Weiner Filter having an analysis section and a synthesis section that includes a processor. The processor includes an algorithm for generating a data adaptive linear transformation, computing an adaptive weighting $w_{med}$ of the data, and applying the computed adaptive weighting $w_{med}$ to a function of a main input signal and an auxiliary input signal to generate an output signal. A plurality of building blocks in a Gram-Schmidt cascaded canceller-type configuration sequentially decorrelate input signals from each other to produce a single filtered output signal. Each building block generates an adaptive weight $w_{med}$ that is applied to generate a local output signal. The effect of non-Gaussian noise contamination on the convergence MOE of the system is negligible. In addition, when desired signal components are included in weight training data they cause little loss of noise cancellation.

28 Claims, 12 Drawing Sheets

U.S. PATENT DOCUMENTS

| | | | |
|---|---|---|---|
| 5,640,429 A | 6/1997 | Michels et al. | |
| 5,694,342 A | 12/1997 | Stein | |
| 5,694,592 A | 12/1997 | Driscoll | |
| 5,696,962 A | 12/1997 | Kupiec | |
| 5,706,013 A | 1/1998 | Melvin et al. | |
| 5,760,734 A | 6/1998 | Urkowitz | |
| 5,963,888 A | 10/1999 | Uhlmann et al. | |
| 5,963,940 A | 10/1999 | Liddy et al. | |
| 6,041,291 A | 3/2000 | Matt et al. | |
| 6,044,336 A | 3/2000 | Marmarelis et al. | |
| 6,058,408 A | 5/2000 | Fischer et al. | |
| 6,121,914 A | 9/2000 | Cavelos et al. | |
| 6,124,828 A | 9/2000 | Champeau | |
| 6,144,937 A * | 11/2000 | Ali | 704/233 |
| 6,263,307 B1 * | 7/2001 | Arslan et al. | 704/226 |
| 6,289,046 B1 * | 9/2001 | Takeuchi et al. | 708/323 |
| 6,904,444 B2 * | 6/2005 | Picciolo et al. | 708/322 |

OTHER PUBLICATIONS

Dumais, LSI Meets TREC: A Status Report, In D.Harman (Ed), The First Text Retrieval Conference (TREC1), National Institute of Standards and Technology Special Publication, 500-207, 1993, pp. 137-152.

Dumais, "Latent Semantic Indexing (LSI) and TREC-2", D. Harman (Ed.), The Second Text Retrieval Conference (TREC2). National Institute of Standards and Technology Special Publication 500-215, 1994, pp. 105-116.

Dumais, "Using LSI for information filtering: TREC-3 experiments," D. Harman (Ed.), The Third Text Retrieval Conference (TREC3), National Institute of Standards and Technology Special Publication, 1995.

Dumais, Automatic Cross-linguistic Information Retrieval using Latent Semantic Indexing, SIGIR'96—Workshop on Cross-Linguistic Information Retrieval, oo. Aug. 16-23, 1996.

Ding, A Similarity-based Probability Model for Latent Semantic Indexing, Proceedings of the 22nd, Annual SIGIR Conference, Berkeley, CA, Aug. 1999.

Guerci et al, Optimal and Adaptive Reduced-Rank STAP, IEEE Transactions on Aerospace and Electronic Systems, vol. 36, No. 2, pp. 647-663, Apr. 2000.

Goldstein et al, A Multistage Representation of the Wiener Filter Based on Orthogonal Projection, IEEE Transactions on Information Theory, vol. 44, No. 7, Nov. 1998, pp. 2943-2959.

Picciolo et al, Pseudo-Median Cascaded Canceller, pending U.S. Appl. No. 09/835,127, filed Apr. 12, 2001.

System and Method for Adaptive Filtering, pending U.S. Appl. No. 09/933,004.

Reed et al, Rapid Convergence Rate in Adaptive Arrays, IEEE Trans. Aerosp. Electron. Syst., AES-10:853-863 (1974).

Antonik et al, Implementation of Knowledge-Based Control for Space-Time Adaptive Processing, Radar 97, Oct. 14-16, 1997, Publication No. 449.

Guerci et al, Principal Components, Covariance Matrix Tapers, and the Subspace Leakage Problem, IEEE Trans. Aerosp. Electron. Syst., vol. 38, No. 1, Jan. 2002, pp. 152-162.

* cited by examiner

MULTISTAGE MEDIAN CASCADED CANCELLER

FIELD OF THE INVENTION

The invention relates in general to an adaptive signal processing system. More specifically, the invention relates to an adaptive signal processing system that utilizes a multistage median cascaded canceller to formulate an efficient data transformation followed by the calculation of adaptive weights and filter out undesired noise.

BACKGROUND OF THE INVENTION

Adaptive signal processing systems have many applications including radar reception, cellular telephones, communications systems, and biomedical imaging. Adaptive signal processing systems utilize adaptive filtering to differentiate between the desired signal and the combination of interference and noise, i.e. thermal or receiver noise. An adaptive filter is defined by four aspects: the type of signals being processed, the structure that defines how the output signal of the filter is computed from its input signal, the parameters within this structure that can be iteratively changed to alter the filter's input-output relationship, and the adaptive algorithm that describes how the parameters are adjusted from one time instant to the next.

Common applications of adaptive signal processing include: an adaptive radar reception antenna array, an adaptive antenna array for adaptive communications, and adaptive sonar. In these systems, desired signal detection and estimation is hindered by noise and interference. Interference may be intentional jamming and or unintentional received radiation. Noise is usually described as ever present receiver thermal noise, generally at a low power level. In these applications antenna arrays may change their multidimensional reception patterns automatically in response to the signal environment in a way that optimizes the ratio of signal power to the combination of interference power plus noise power (abbreviated as SINR). The array pattern is easily controlled by weighting the amplitude and phase of the signal from each element before combining (adding) the signals. In general, multidimensional samples may be collected, e.g. over antenna elements, over time, over polarization, etc., where each sample is a separate input channel to the adaptive processor. Adaptive arrays are especially useful to protect radar and communication systems from interference when the directions of the interference are unknown or changing while attempting to receive a desired signal of known form. Adaptive arrays are capable of operating even when the antenna elements have arbitrary patterns, polarizations, and spacings. This feature is especially advantageous when an antenna array operates on an irregularly shaped surface such as an aircraft or ship.

Adaptive signal processing systems are required to filter out undesirable interference and noise. Due to the lack of a priori knowledge of an external environment, adaptive signal processing systems require a certain amount of statistically independent weight training data samples to effectively estimate the input noise and interference statistics.

"Ideal" weight training data has a Gaussian probability distribution for both its real and imaginary baseband components. However, real-world weight training data may be contaminated by undesirable impulse noise outliers, resulting in a non-Gaussian distribution of real and imaginary components.

The number of weight training data samples required for SINR performance of the adaptive processor to be within 3 dB of the optimum on average is called the convergence measure of effectiveness (MOE) of the processor. A signal is stationary if its statistical probability distribution is independent of time. For the pure statistically stationary Gaussian noise case, the convergence MOE of the conventional Sample Matrix Inversion (SMI) adaptive linear technique can be attained using approximately 2N samples for adaptive weight estimation, regardless of the input noise covariance matrix, where N is the number of degrees of freedom in the processor (i.e., the number of antenna elements or subarrays) for a spatially adaptive array processor, or N is the number of space-time channels in a space-time adaptive processing (STAP) processor). Referred to as the SMI convergence MOE, convergence within 3 dB of the optimum using approximately 2N samples for adaptive weight estimation has become a benchmark used to assess convergence rates of full rank adaptive processors. General information regarding SMI convergence MOE may be found in Reed, I. S., Mallet, J. D., Brennan, L. E., "Rapid Convergence Rate in Adaptive Arrays", IEEE Trans. Aerospace and Electronic Systems, Vol. AES-10, No. 6, November, 1974, pp. 853–863, the disclosure of which is incorporated herein by reference.

Conventional sample matrix inversion (SMI) adaptive signal processing systems are capable of meeting this benchmark for the pure statistically stationary Gaussian noise case. If, however, the weight training data contains non-Gaussian noise outliers, the convergence MOE of the system increases to require an unworkably large number of weight training data samples. The performance degradation of the SMI algorithm in the presence of non-Gaussian distributions (outliers) can be attributed to the highly sensitive nature of input noise covariance matrix estimates to even small amounts of impulsive non-Gaussian noise that may be corrupting the dominant Gaussian noise distribution. General information regarding the sensitivity of the SMI algorithm may be found in Antonik, P. Schuman, H. Melvin, W., Wicks, M., "Implementation of Knowledge-Based Control for Space-Time Adaptive Processing", IEEE Radar 97 Conference, 14–16 Oct., 1997, p. 478–482, the disclosure of which is incorporated herein by reference.

Thus, for contaminated weight training data, convergence rate may slow significantly with conventional systems. Fast convergence rates are important for several practical reasons including limited amounts of weight training data due to non-stationary interference and computational complexity involved in generating adaptive weights. In other words, the time which elapses while a conventional system is acquiring weight training data and generating adaptive weights may exceed the stationary component of a given non-stationary noise environment, and an adaptive weight thus generated has become obsolete prior to completion of its computation.

Most real world data does not have a purely Gaussian probability distribution due to contamination by non-Gaussian outliers and/or desired signal components. Conventional signal processors assume that the weight training data has a Gaussian distribution, and therefore they do not perform as well as theory would predict when operating with real world data. If weight training data contains desired signals that appear to be outliers, the performance is similarly degraded. In an effort to compensate for these performance problems, conventional systems employ subjective data screening techniques to remove perceived outliers from the data prior to processing. However, subjective screening is undesirable because the process is ad-hoc in nature, requires many extra processing steps, and may even degrade system performance.

Optimal, reduced rank, adaptive processors are derived primarily to combat the problem of non-stationary data conditions (i.e. low sample support) often encountered in general applications. However, they still have convergence MOE's that are degraded by outliers. For radar applications, these provide better SINR output than full rank methods, typically through the use of localized training data to improve statistical similarity with the range cell under test (CUT). An exemplary system is described in U.S. patent application Ser. No. 09/933,004, "System and Method For Adaptive Filtering", Goldstein et al., incorporated herein by reference.

Also, full rank, robust, adaptive processor research has resulted in novel open loop processors capable of accommodating an amount of non-Gaussian/outlier contaminated and nonstationary data, while still producing an SMI-like convergence MOE. An exemplary system is described in U.S. patent application Ser. No. 09/835,127, "Pseudo-Median Cascaded Canceller", Picciolo et al., incorporated herein by reference, hereinafter referred to as a median cascaded canceller.

Reduced rank processors have a convergence MOE typically on the order of 2r, where r is the effective rank of the interference covariance matrix. Effective rank refers to that value of r which is associated with the dominant eigenvalues of the interference and noise covariance matrix. General information regarding "effective rank" and general trends in the convergence trends MOE of reduced rank processors may be found in "Principal Components, Covariance Matrix Tapers, and the Subspace Leakage Problem", J. R. Guerci and J. S. Bergin, *IEEE Transactions on Aerospace and Electronic Systems*, Vol. 38, No. 1, Jan. 2002.

Given the demonstrated capabilities of these processors, it would be desirable to provide an adaptive signal processing system that utilizes features of both these types of systems.

SUMMARY OF THE INVENTION

The present invention provides an adaptive signal processing system that utilizes an MWF filter in combination with a median cascaded canceller to compute a non-adaptive data transformation, forming a main channel and a set of auxiliary channels, followed by a data adaptive transformation and a set of adaptive weights to generate a filtered output signal. The effect of non-Gaussian non-stationary noise contamination on the convergence MOE of the system is significantly reduced. In addition, when desired signal components are included in weight training data they cause reduced deleterious effects on noise cancellation.

In a preferred embodiment, the system and method are directed to an adaptive signal processing system that includes an analysis section of a Multistage Weiner Filter (MWF), a modified synthesis section of the MWF, which includes a main input channel for receiving a global main input signal, a set of global auxiliary input channels for receiving a corresponding set of auxiliary input signals, and a processor. The global main and the global auxiliary channels may be formed by a non-adaptive linear transformation of the original data channels. The processor includes an algorithm for generating a non-adaptive linear transformation producing a global main channel and global auxiliary channels, a data adaptive linear transformation, followed by an adaptive weighting and subtraction of the auxiliary data channels from the global main channel. The system includes a plurality of building blocks arranged in a Gram-Schmidt cascaded canceller-type configuration for sequentially decorrelating input signals from each other to thereby yield a single filtered output signal. Each building block includes a local main input channel which receives a local main input signal, a local auxiliary input channel which receives a local auxiliary input signal, and a local output channel which sends a local filtered output signal. Each building block generates an adaptive weight that preferably uses just the real parts of a set of complex values determined from the ratios of the local main channel samples to the local auxiliary channel samples, $w_{med}$. Each building block generates a local output signal utilizing the adaptive weight.

The effect of non-Gaussian noise contamination on the convergence MOE of the system is negligible. In addition, when desired signal components are included in weight training data they cause little loss of noise cancellation.

It would advantageously adaptively process non-stationary data conditions via reduced rank processing while also accommodating outlier contaminated weight training data, ideally producing a convergence MOE comparable to the above referenced benchmark for reduced rank processors, and potentially reducing desired signal cancellation when weight training data includes desired signal components.

Other advantages and features of the invention will become apparent from the following detailed description of the preferred embodiments and the accompanying drawings.

DETAILED DESCRIPTION OF THE PREFERRED EMBODIMENTS

Figure 1:
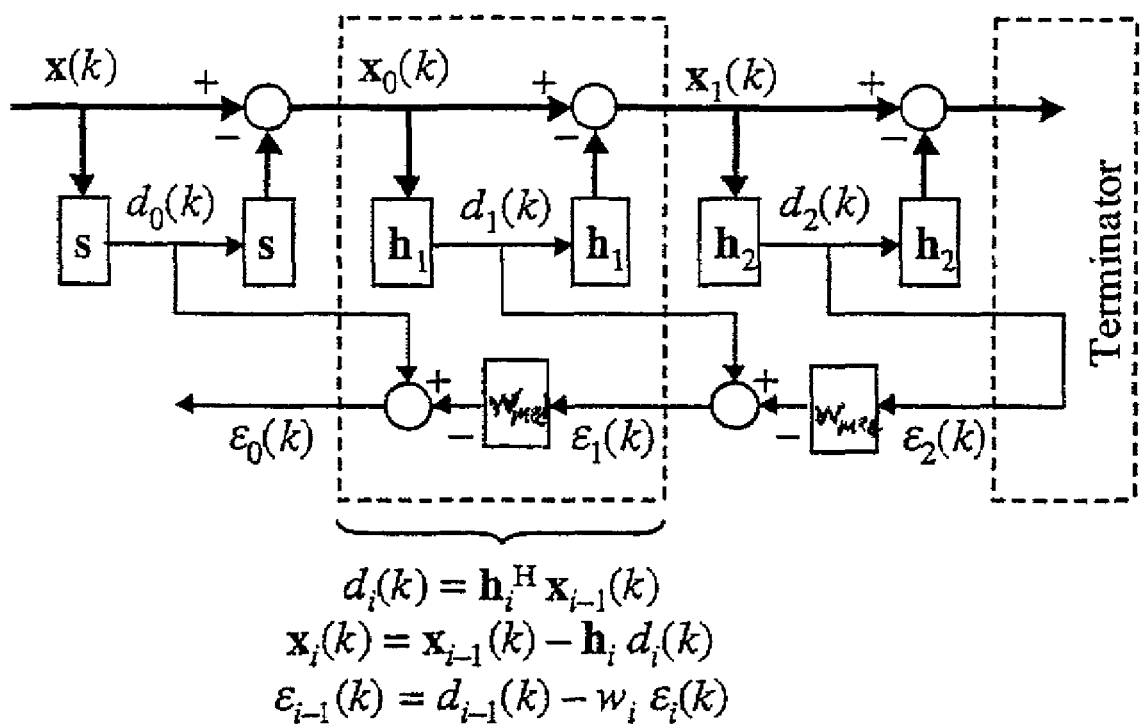
FIG. 1 is a schematic diagram of an MMCC according to the invention.
Figure 2:
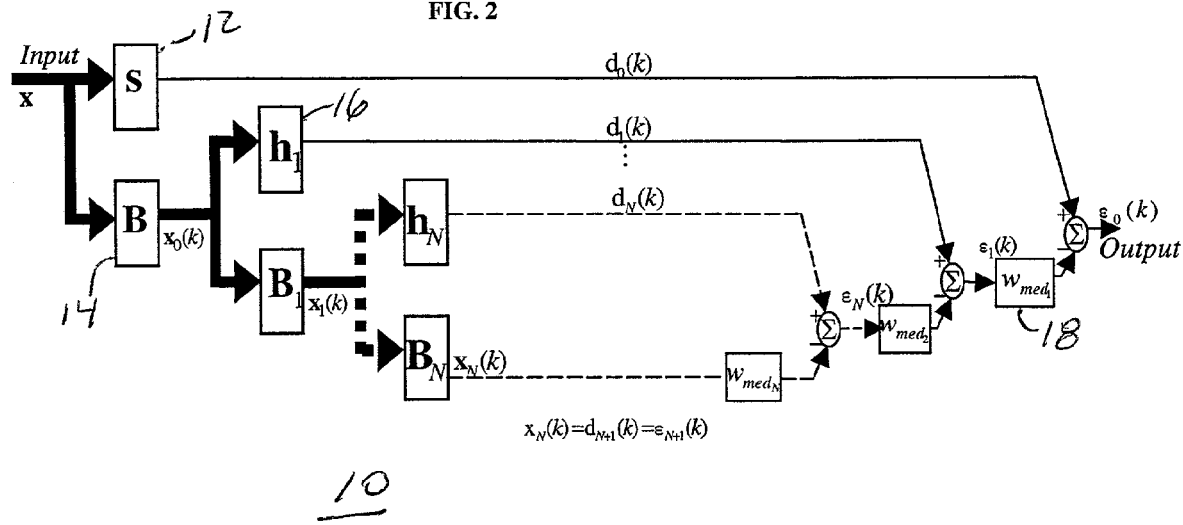
FIG. 2 is a schematic diagram of an MMCC according to the invention.
Figure 3:
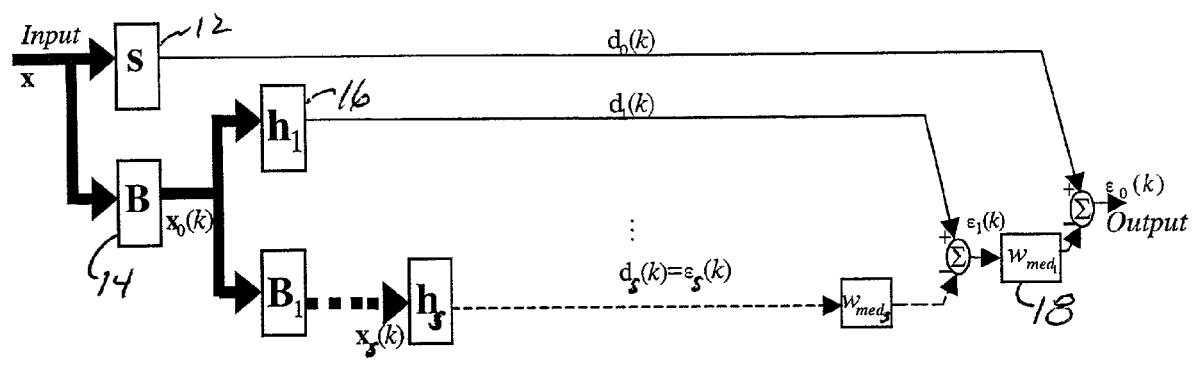
FIG. 3 is a schematic diagram of an MMCC according to the invention.

Referring now to FIGS. 1–3, a Multistage Median Cascaded Filter (MMCC) 10 receives input data x(k). The x(k) data stream is applied to a steering vector s 12, where processing begins with non-adaptive calculations. First, the data vectors are projected onto the steering vector to form an initial estimate of the desired signal:

$$d_0(k)=s^H x(k). \quad (1)$$

For example, $d_0(k)$ may be the output of a conventional beamformer or a matched filter. In general, $d_0(k)$ contains interference that comes in through the sidelobes of s. To prepare for a statistical analysis that will identify and subtract this interference, the rest of the data may be isolated by writing $$x_0(k)=Bx(k), \quad (2)$$

where B is a "blocking matrix" 14 that finds the projection of the data x(k) orthogonal to s, i.e., the projection onto the nullspace of s.

The projection operation in (2) is uniquely defined. However, the projection can be accounted for in at least two ways. In earlier approaches, the blocking matrix was rectangular to account for the result being an N−1 dimensional vector (i.e., a vector with length N−1). The other possibility is to consider the square blocking matrix:

$$B=I-ss^H.$$

The square matrix accounts for the same projection, but the projection may be viewed as a subtraction in the fixed perspective of the original N-dimensional coordinate system (i.e., where all vectors have length N). The choice between these two blocking matrices is relevant to the numerical efficiency realized in the present invention. By choosing the square blocking matrix in preferred embodiments of the present invention, we can re-write (2) as $$x_0(k)=[I-ss^H]x(k)=x(k)-sd_0(k)$$

By accounting for the projection in preferred embodiments of the present invention with the subtraction in the preceding equation, the computational cost for a block is O(NK). This gives us a significant savings over the matrix multiplication shown in (2), which would cost $O(N^2 K)$.

Given $d_0(k)$ and $x_0(k)$ as new inputs, the processing continues with a recursion of adaptive stages. The index i identifies the adaptive stage number (where i=1 is the first adaptive stage, and so on). To support stage i, the block-averaged correlation between the two inputs to that stage is calculated according to $$r_{i-1}=<x_{i-1}(k)d^*_{i-1}(k)>_K. \quad (3)$$

Stage i will use this correlation in terms of the correlation magnitude $\delta_i$ and the correlation direction vector $h_i$ 16, $$\delta_i=\|r_{i-1}\|=(r_{i-1}^H r_{i-1})^{1/2}, \quad (4)$$

and $$h_i=r_{i-1}/\|r_{i-1}\|. \quad (5)$$

While the correlation direction vector can be calculated by using block averaging with uniform weighting over the block, other averaging techniques known to those skilled in the art may be used, based on the requirement of the particular application (e.g., time constraints, accuracy requirements) and the availability of processing resources. The projections of the data along this direction and orthogonal to this direction can account for this projection as a subtraction, $$d_i(k)=h_i^H x_{i-1}(k) \quad (6)$$

and $$x_i(k)=[I-h_i h_i^H]x_{i-1}(k)=x_{i-1}(k)-h_i d_i(k). \quad (7)$$

It should be noted that Equations (6) and (7) pertain to FIG. 1 in that these particularly apply to an embodiment of the invention that employs a square blocking matrix, such as is described in the above-referenced U.S. Ser. No. 09/933,004. For other embodiments using non-square matrices, $x_i(k)=B_i x_{i-1}(k)$ and Equation (6) apply in that form but with different dimensions. Either method may be considered a specific implementation used to generate a Krylov subspace representation of the original data, such as is described in *The Theory of Matrices*, P. Lancaster and M. Tismenstsky, Academic Press (1985), incorporated herein by reference. Any other method used to generate such a Krylov subspace representation of the data may be equivalently substituted. In the follow-on synthesis stage of the present invention, median-based filtering (denoted by the use of $w_{med}$ weights in FIGS. 1 and 2) is then applied to the Krylov subspace. This recursive analysis may be terminated in several ways. If the block of data X has full rank, then the projections may continue until all the data is projected onto a set of orthogonal unit vectors [s, $h_1, h_2, \ldots, h_{N-1}$]. This analysis would use N−1 stages (because s accounted for one direction already). Or, if the block of data X is not full rank (for example, if K<N is intentionally selected), then the rank of the data will "underflow" in the analysis. In that case, $x_i(k)$ would contain only zeros for the highest stages Referring also now to FIG. 3, alternatively, the filtering may be intentionally truncated to some smaller number of stages s (where $1 \leq s \leq N-1$). Once the analysis is finished, the initialization $\epsilon_s(k)=d_s(k)$ begins the synthesis along the lower chain of FIG. 1 from right to left.

The synthesis may be better understood by considering a conventional general adaptive array having a sidelobe canceller form and a conventional Gram-Schmidt cascaded canceller. The adaptive implementation of a conventional Gram-Schmidt cascaded canceller provides a cascaded set of operationally identical, two-input canceller Gram-Schmidt $L_2$ building blocks, as is well known in the art. In accordance with the MMCC of the present invention, these Gram-Schmidt $L_2$ building blocks are replaced with new $L_{med}$ building blocks. Each $L_{med}$ building block generates an adaptive weight $w_{med}$ that in one form is a complex adaptive weight whose real and imaginary parts are found, as is further described below, by taking the sample median value of the ratio of local main input weight training data z to local auxiliary input weight training data x for the real and imaginary parts separately, applies the computed weight to a function of a local main input signal and a local auxiliary input signal, and generates a filtered output signal.

Theoretically, the $L_{med}$ building blocks produce the same optimal weight as the Gram-Schmidt $L_2$ building blocks if the number of samples of training data is very large (K→∞), and the two inputs each have symmetric probability density functions about the mean for their real and imaginary components (an example is the Gaussian pdf). In addition, the convergence MOE of the median cascaded canceller offers a significant improvement upon Gram-Schmidt cascaded cancellers in the presence of non-Gaussian noise outliers or equivalently, for some cases, when desired signal components are present in the training data.

A sidelobe canceller is a specific form of the general adaptive array where the N×1 desired signal (steering) vector is set to $[1 0 0 \ldots 0]^T$, the "main" or first channel weight is fixed to unity, and the (N−1)×1 auxiliary channel adaptive weight vector estimate $\hat{w}_a$ (^ denotes 'estimate of') solves the adaptive Wiener-Hopf matrix equation, $$\hat{w}_a = \hat{R}_a^{-1} \hat{r}_{am},$$

where $\hat{R}_a$ is the (N−1)×(N−1) auxiliary channel input noise and interference estimate, and $\hat{r}_{am}$ is the (N−1)×1 cross-correlation vector estimate between the auxiliary channels and the main channel. For Gaussian statistics, the maximum likelihood estimates of these quantities are $$\hat{R}_a = \frac{1}{K} \sum_{k=1}^{K} u_a(k) u_a(k)^H$$

and $$\hat{r}_{am} = \frac{1}{K} \sum_{k=1}^{K} u_a(k) u_m(k)^*,$$

where K is the number of weight training data samples used in the averages and * denotes complex conjugate operation. When employing equation (2) and equation (3), the sidelobe canceller uses the SMI algorithm, and its scalar output, g, is (using vector partitioning)

$$g = w_{slc}^H u = \begin{bmatrix} 1 \\ \cdots \\ -\hat{w}_a \end{bmatrix}^H u.$$

The conventional SMI-based sidelobe canceller in this last equation has an equivalent Gram-Schmidt cascaded canceller form in the steady state and in the transient state with numerically identical outputs, where transient state refers to the case where weights are estimated from finite length data vectors. Infinite numerical accuracy is assumed, i.e., the cascaded weights correspond to a numerically equivalent set of linear weights equation (1) that can be applied directly to the transformed array input data vector u via equation (4), if so desired.

Figure 4:
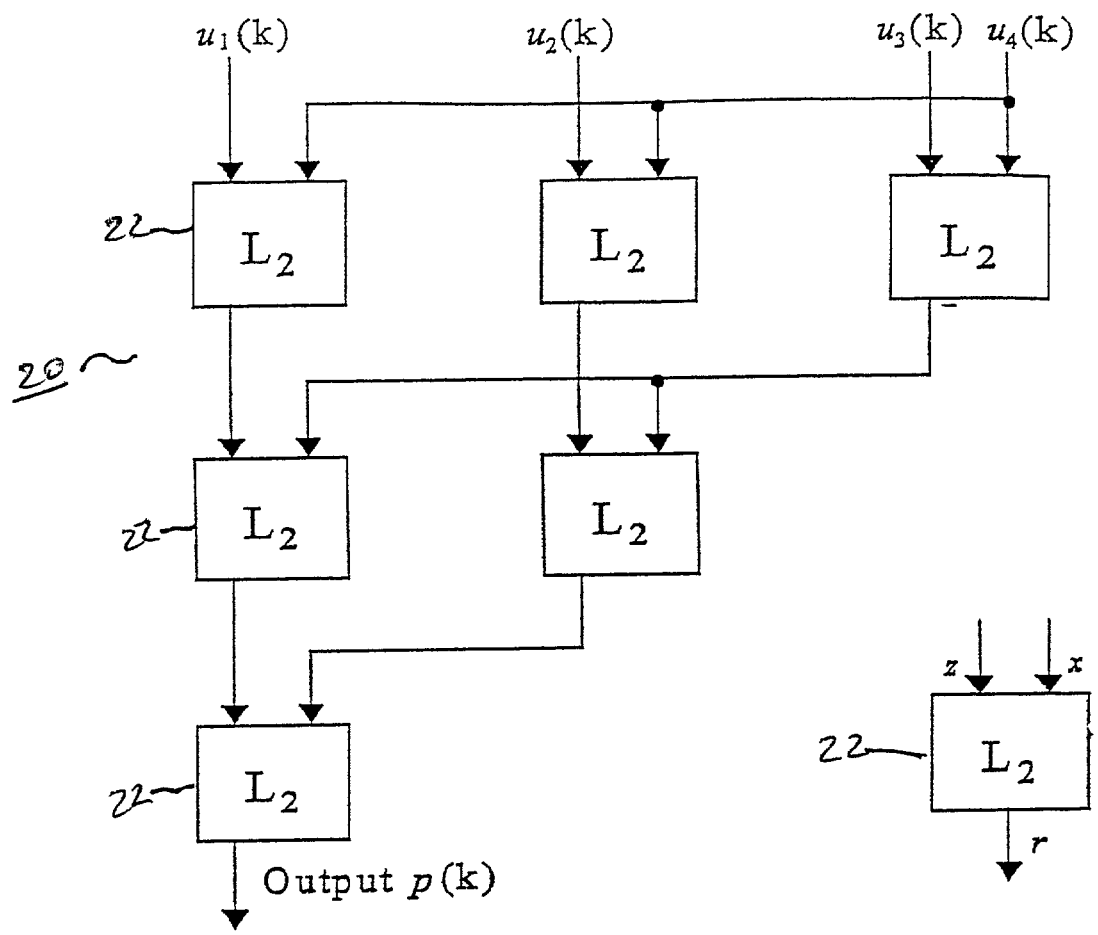
FIG. 4 is a block diagram of a conventional sample matrix inversion processor shown as an equivalent Gram-Schmidt cascaded canceller processor.

FIG. 4 illustrates a conventional Gram-Schmidt canceller 20 for the N=4 channel case, comprised of six identical two-input canceller Gram-Schmidt $L_2$ building blocks 22. In each building block 22, the optimal weight estimate for that building block is calculated by minimizing the square of the $L_2$-norm of the residual output vector from that building block, over some specified number of K weight training data samples.

Figure 5:
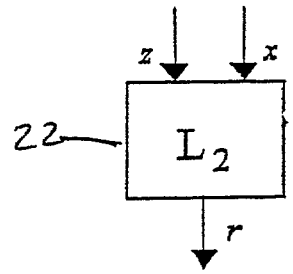
FIG. 5 is a single block of a conventional Gram-Schmidt cascaded canceller processor.

FIG. 5 illustrates a single Gram-Schmidt $L_2$ building block 22. For notational simplicity, the left input of any single building block is relabeled z, the right input is relabeled x, and the output is relabeled r. Each building block 22 serves to have the component of z which is correlated with x, subsequently subtracted from z. This is accomplished by choosing an optimum weight estimate $\hat{w}_{opt}$ such that the residual r is statistically uncorrelated with x. The least-squares method is used to estimate $w_{opt}$ by minimizing over the set of complex weights w, the square of the $L_2$ norm of the residual output $r = z − w^* x$ where $r = r(k)$, $z = z(k)$, and $x = x(k)$, for $k = 1, \ldots, K$; i.e., for any single building block, $$\hat{w}_{opt} = \arg\min_w \left[ \frac{1}{K} \sum_{k=1}^{K} \left| z(k) - w^* x(k) \right|^2 \right].$$

This results in the scalar adaptive Wiener-Hopf equation, $$\hat{w}_{opt} = \hat{R}_{xx}^{-1} \hat{r}_{xz},$$

where maximum likelihood estimates again may be used for the scalar input noise covariance estimates, assuming Gaussian statistics, $$\hat{R}_{xx} = \frac{1}{K} \sum_{k=1}^{K} x(k) x(k)^*,$$

and $$\hat{r}_{xz} = \frac{1}{K} \sum_{k=1}^{K} x(k) z(k)^*.$$

Note that these last two equations are sensitive to non-Gaussian noise contaminants just like their matrix counterparts.

As set forth above the conventional general adaptive array processor may be equivalently transformed in terms of SINR into its conventional Gram-Schmidt cascaded canceller form. The adaptive implementation of a conventional Gram-Schmidt cascaded canceller provides a cascaded set of operationally identical, two-input canceller $L_2$ building blocks.

Figures 6, 7:
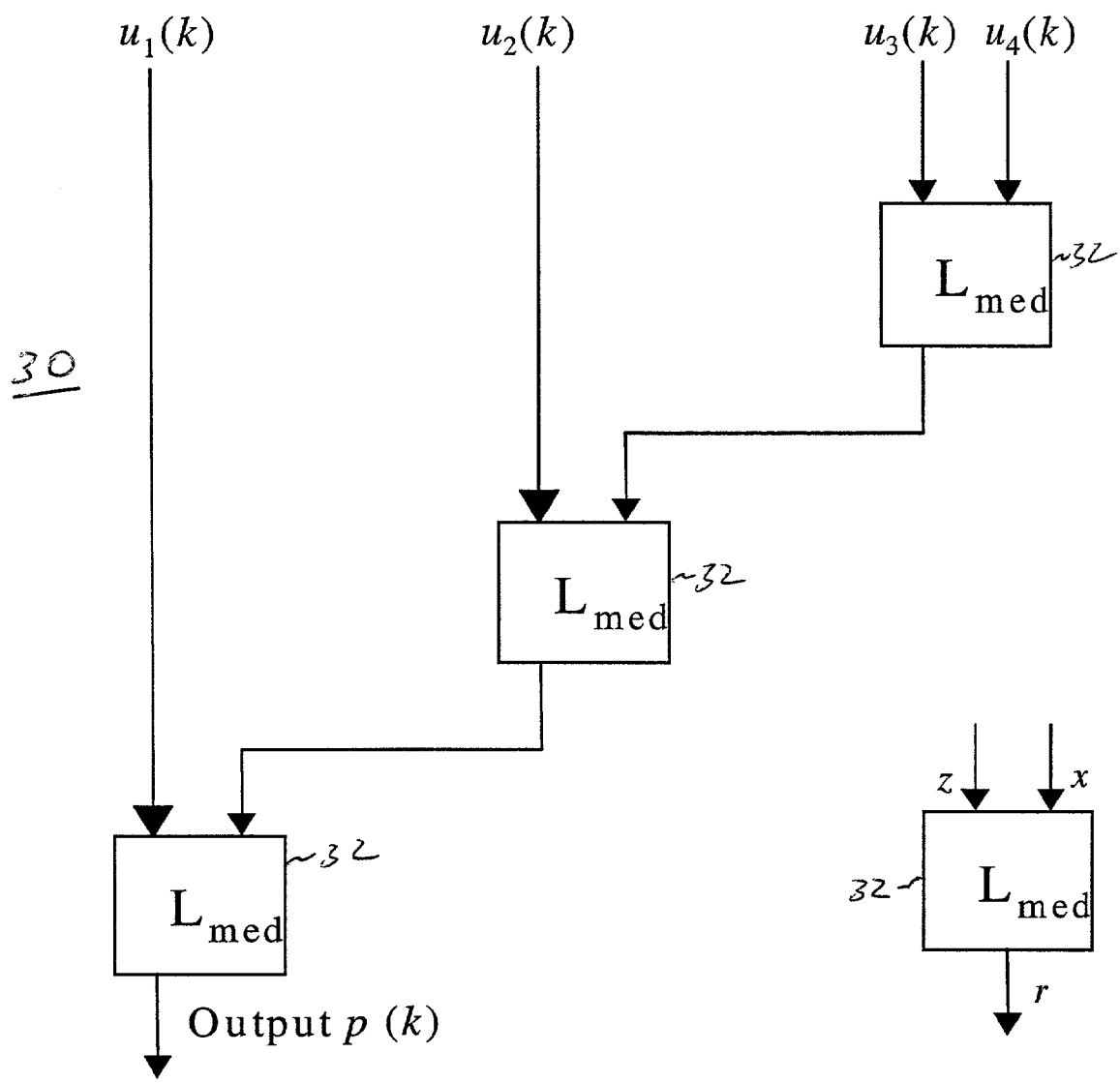
FIG. 6 is a block diagram of a cascaded canceller processor component of an MMCC according to the present invention.
FIG. 7 is a single building block of a cascaded canceller processor component of an MMCC according to the present invention.

Replacing the $L_2$ building blocks 22 with $L_{med}$ building blocks throughout a cascaded canceller 30 as illustrated in FIG. 6 results in the MMCC configuration of the present invention. FIG. 7 illustrates a single $L_{med}$ building block canceller 32. Each of the $L_{med}$ building blocks 32 computes an adaptive weight $w_{med}$ that in one form is a complex adaptive weight whose real and imaginary parts are found by taking the sample median value of the ratio of local main input weight training data to local auxiliary input weight training data for the real and imaginary parts separately. The preferred embodiment uses just the median of the real parts and sets the imaginary part to zero. Each of the $L_{med}$ building blocks 32 then applies the complex conjugate of the computed weight $w^*_{med}$ to a function of a local main input signal and a local auxiliary input signal, and generates a filtered local output signal, r, by solving the following equation: $r = z − w^*_{med} x$. Although the cascaded canceller illustrated has N=4 inputs, any number N of inputs may be utilized.

In the first level of processing, N input signals are input into N−1 $L_{med}$ building blocks 32 to generate N−1 local output signals. In the next level of processing, N−1 local input signals are input into N−2 $L_{med}$ building blocks 32 to generate N−2 local output signals. This process is repeated until one final output signal remains.

The MMCC 10 of the present invention may be implemented by a set of program instructions on an arithmetical processing device such as a general-purpose digital signal processor (DSP) or microprocessor to carry out in real time the computational steps presented above. Alternatively, custom-built application specific integrated circuits (ASIC), field-programmable gate arrays (FPGA), or firmware can be fabricated to perform the same computations as a set of logic instructions in hardware. These implementations are interchangeable.

The $L_{med}$ building block 32 computes adaptive weight, $w_k$, as the sum of a real part and an imaginary part, which are found by taking the sample median value of the ratio of local main input weight training data to local auxiliary input weight training data for the real and imaginary parts separately. First, form the set $w_k$ as $w_k=(z(k)/x(k))^*$, for $k=1,2,\ldots,K$ where K is the number of training samples. The sample median of the real parts of $\{w_k\}$ is taken as the real part of the new optimal weight, and the sample median of the imaginary parts of $\{w_k\}$ is taken as the imaginary part of the new optimal weight. As $K\to\infty$, and assuming that, for this analysis, there are no outliers, the resulting adaptive weight, $$w_{med} = \underset{k=1\ to\ K}{MED}\left[\text{real}\left(\frac{z(k)^*}{x(k)^*}\right)\right] + j\left\{\underset{k=1\ to\ K}{MED}\left[\text{imag}\left(\frac{z(k)^*}{x(k)^*}\right)\right]\right\} \quad (8)$$

converges to the same optimal complex weight as a Gram-Schmidt $L_2$ building block using the same weight training data, and as shown in the above referred to U.S. Ser. No. 09/835,127, this convergence only assumes symmetric densities for the real and imaginary portions of the noise density. For Gaussian noise, the two-input convergence MOE was shown to be $E\{\eta\}=1+2/(K-1)$, where E denotes expectation and $\eta$ denotes output residue power, normalized to the optimum value achievable. This is seen to be commensurate to the $L_2$ convergence MOE of $1+1/(K-1)$, which is not nearly as robust as the $L_{med}$ building block is to outliers in the training data. The two-input $L_{med}$ algorithm, like the two input $L_2$ algorithm, convergence rate, is only a function of the number of samples, K, and thus is independent of the two-input, input noise covariance matrix.

The MMCC 10 is a data-adaptive filter that can be used for signal detection, estimation, and classification. For example, when used with a steering vector s, it can process a stream of one or more blocks of data vectors x(k) to estimate how much the data resembles a replica vector s. In more sophisticated applications, MMCC 10 can satisfy multiple constraints (where a single steering vector s may be replaced by a matrix of steering vectors). For radar applications, these provide improved SINR output compared to full rank methods, typically through the use of localized training data to improve statistical similarity with the range cell under test (CUT).

FIGS. 8–15 demonstrate the major increase in performance obtained from MMCC 10 compared with previous systems. To illustrate the performance improvement of the MMCC over the MWF, data is modeled as received by an adaptive airborne (moving) radar, created using the high fidelity RLSTAP airborne radar model. There are two barrage jammers as well as ground clutter modeled with a 45 degree antenna crab angle. The MWF is used with a rank r=50 (out of 112 total DOF-14 antenna elements times 8 pulses) and K=2 r=100 samples are used to train adaptive weights. The chosen steering vector points the mainbeam at zero degrees azimuth angle and at −0.47 normalized Doppler frequency.

Figure 8A:
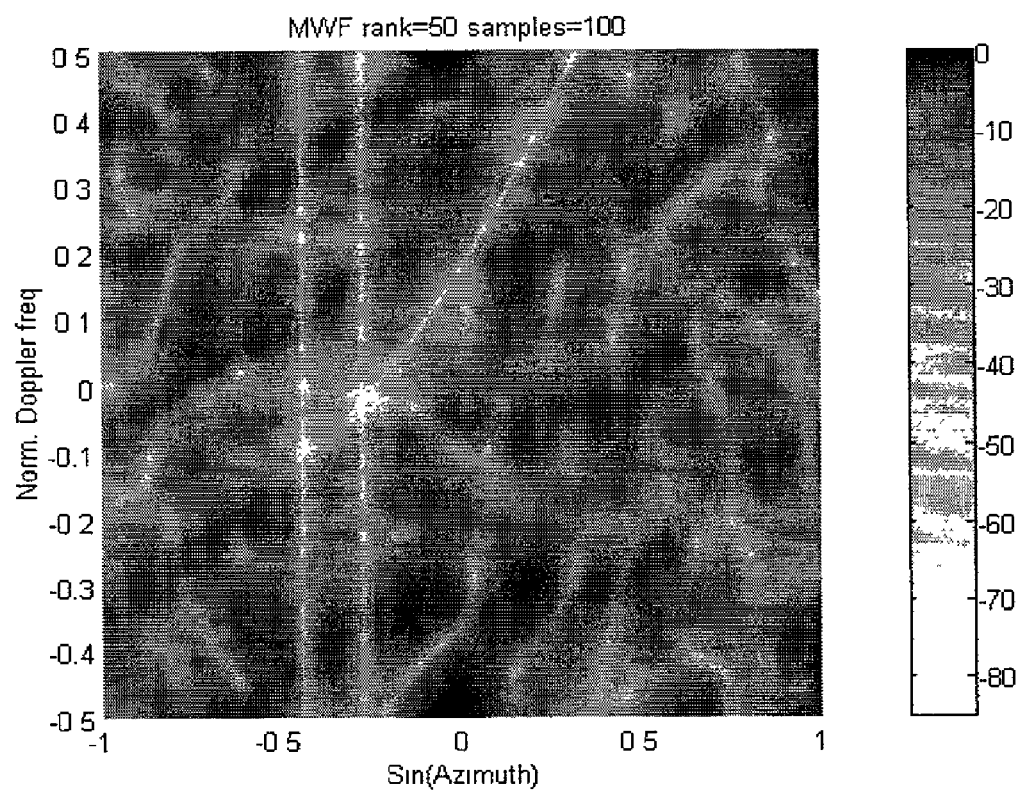
FIGS. 8a–b are graphs showing the adapted pattern produced by an MWF as in the prior art.
Figure 8B:
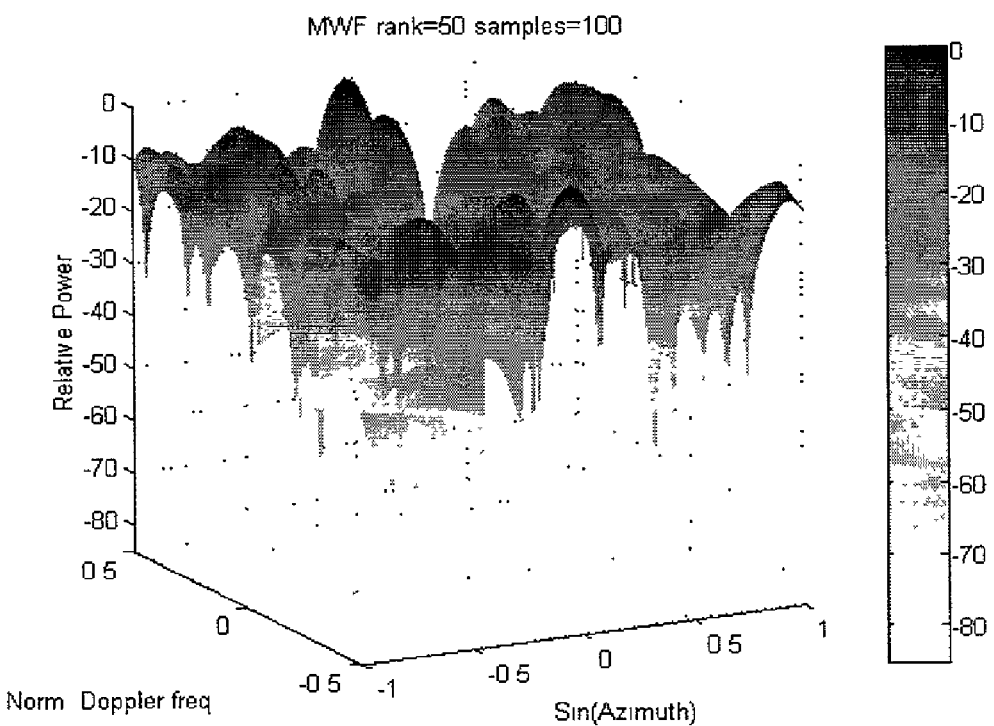

FIG. 8(a) shows the adapted pattern produced by the MWF, after a self-normalization such that the peak pattern value is 0 dB. (All pattern plots illustrated in these figures are self-normalized in this manner). The simulated clutter ridge cuts diagonally across the azimuth-Doppler plane and aliases up to the limited angular extent (45 deg.) of the modeled antenna pattern. There are two vertical nulls that indicate the filter response to both barrage jammers. The target energy comes through with unity gain satisfying the MVDR constraint, however due to the self-normalization, it is possible the patterns show the target gain different from 0 dB. The interference is well-nulled as shown by the two lines at the jammer azimuths and along the diagonal clutter ridge, but the azimuth-Doppler sidelobe levels are high, close to the mainbeam peak level, averaging approximately −10 dB. FIG. 8(b) is a 3-dimensional view further illustrating the pattern. Therefore, any interference not sensed (and therefore not nulled) by the adaptive algorithm can pass with little or no attenuation and even experience gain, consequently masking targets or producing false alarms. The mainbeam peak is actually aliasing across both edges of the Doppler axis as seen by two peaks near −0.5 and +0.5 Doppler frequency.

Figure 9A:
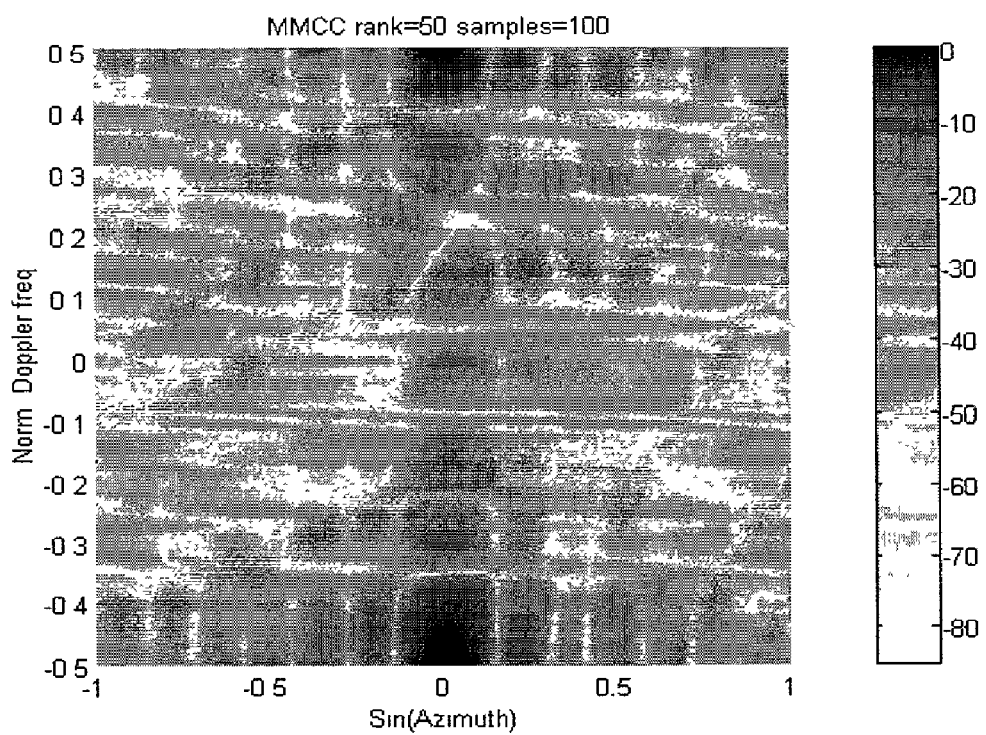
FIGS. 9a–b are graphs showing the adapted pattern produced by an MMCC according to the invention.

For the MMCC 10, however, as shown in FIGS. 9(a) and (b), the interference is nulled, and the average sidelobe level reduces to approximately −25 dB, which is a 15 dB improvement compared to the MWF. This feature improves overall target detection ability when any under-nulled azimuth-Doppler sidelobe interference energy may be present in the CUT. Neither extra training samples nor diagonal loading was required to obtain this effect. In addition, the steering vector sidelobes are markedly obvious for the MMCC processor, further illustrating the reduction in depth of the adapted azimuth-Doppler sidelobe levels.

Figure 9B:
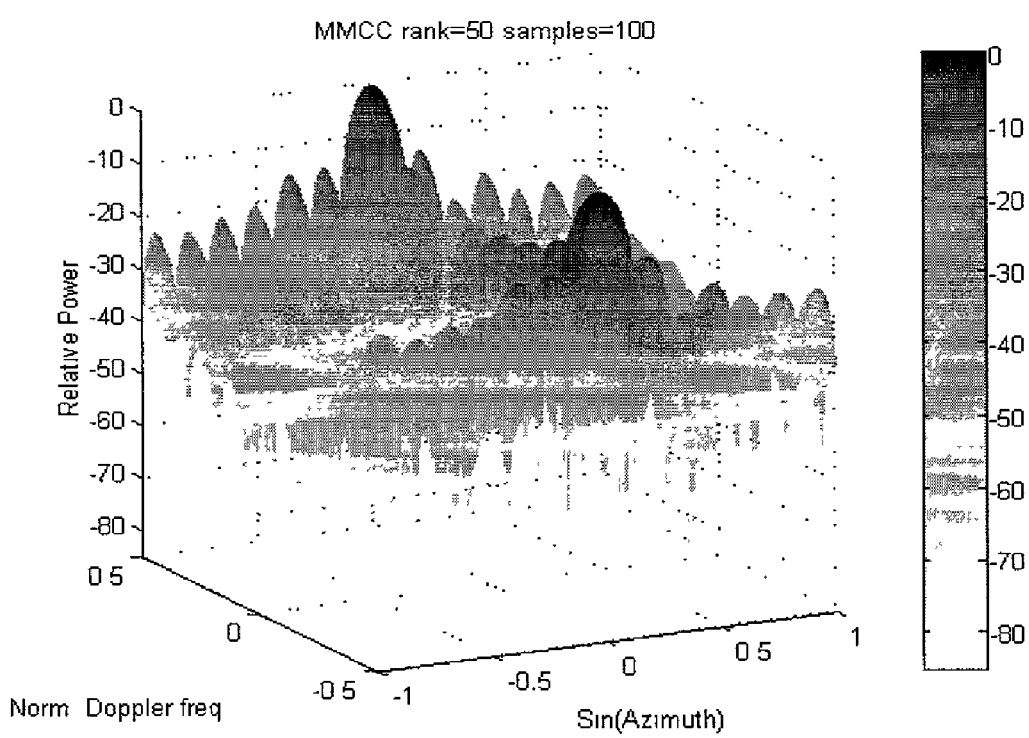
Figure 10:
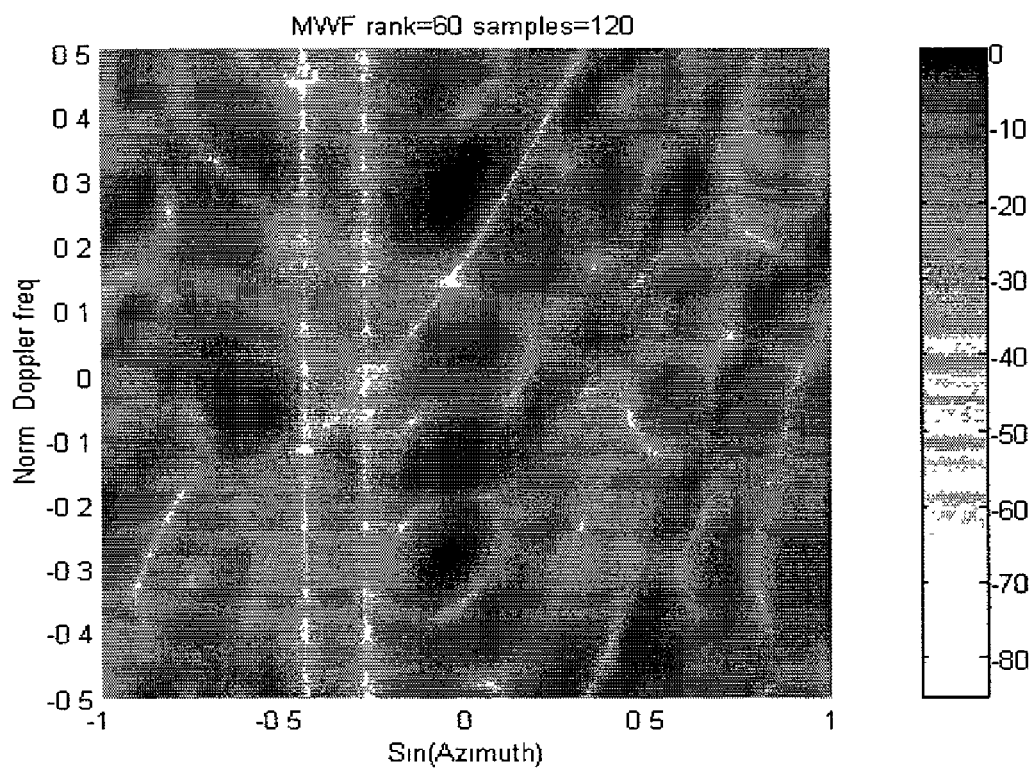
FIG. 10 is a graph as in FIG. 8(a) for an MWF having a different configuration.
Figure 11:
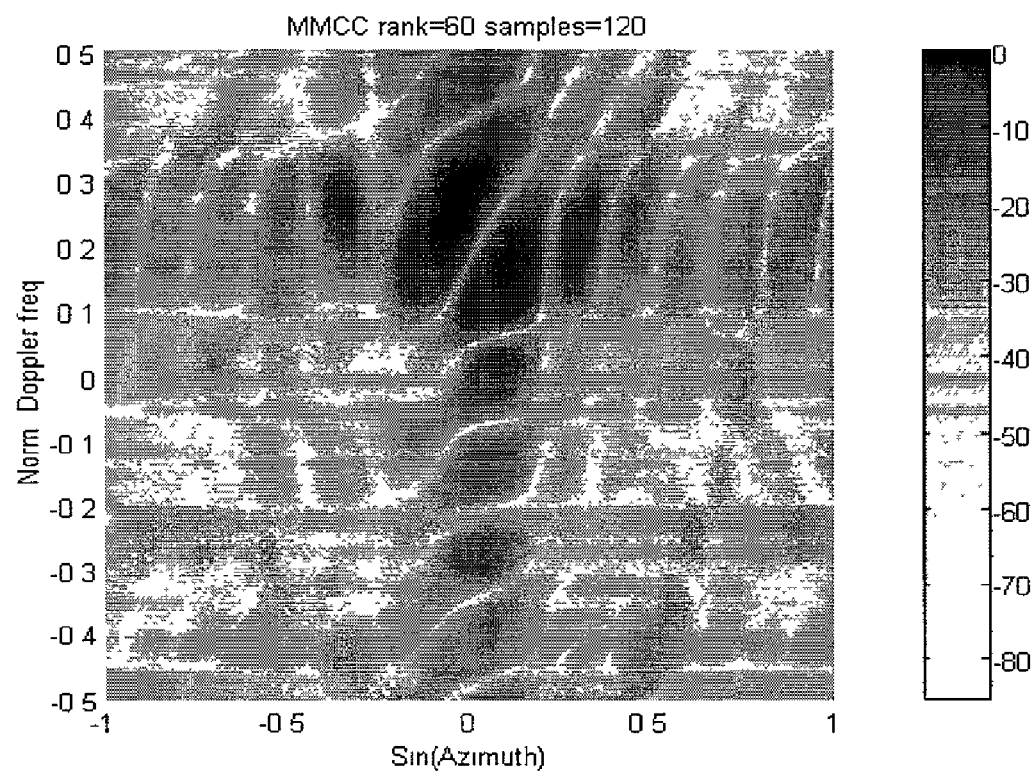
FIG. 11 is a graph is in FIG. 9(a) for an MMCC having a different configuration in accordance with the invention.

In FIGS. 10 and 11, the MWF and MMCC patterns are shown for the same simulated data as in FIGS. 8 and 9, except that rank r=60, and K=120 samples. There is good interference mitigation along with the same trend of substantially lower adapted sidelobe levels. The mainbeam is positioned near the clutter ridge (az., +0.23 Dop.) to simulate looking for targets at the MDV. The MMCC has a better adapted mainbeam pattern in this region, indicating an improved 'slow speed' target detection performance. The MWF does not have a well-split antenna mainbeam like the MMCC over top of the strong interference (clutter), and the MWF mainbeam peak is distorted and misaligned with the chosen steering vector due to its proximity to, and influence by, the strong clutter null. The MMCC mainbeam resilience near strong interference is a valuable characteristic of the MMCC processor, as well as of the MCC processor (not illustrated).

Figure 12A:
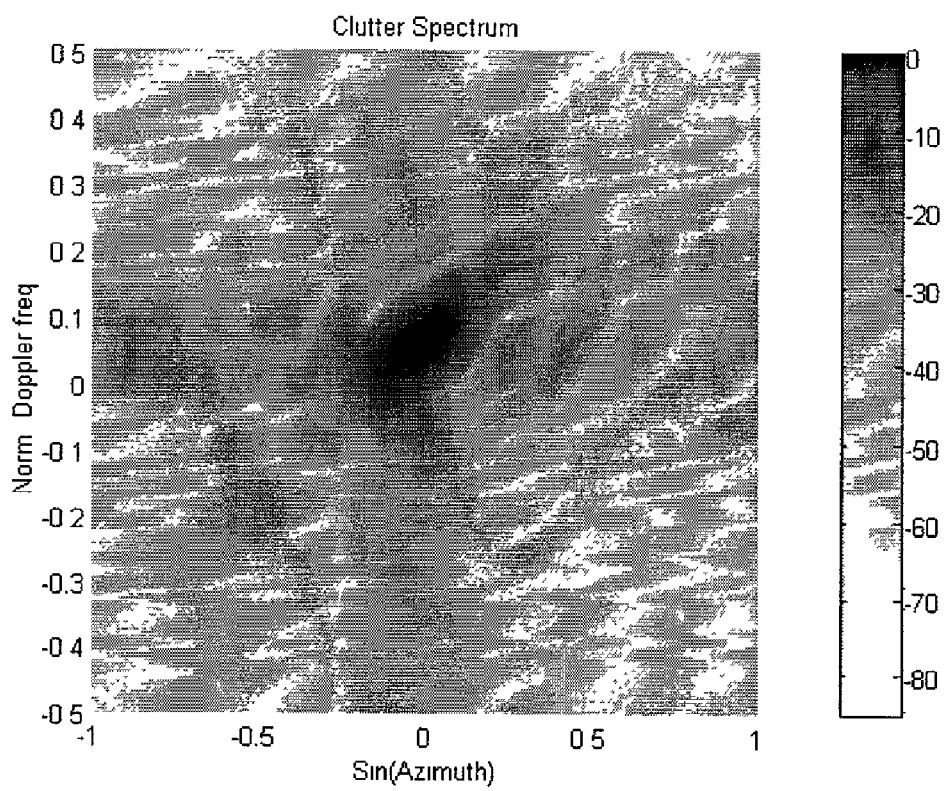
FIGS. 12a–b show the clutter spectrum for measured airborne radar data illustrating the input statistics input to an MMCC according to the invention.
Figure 12B:
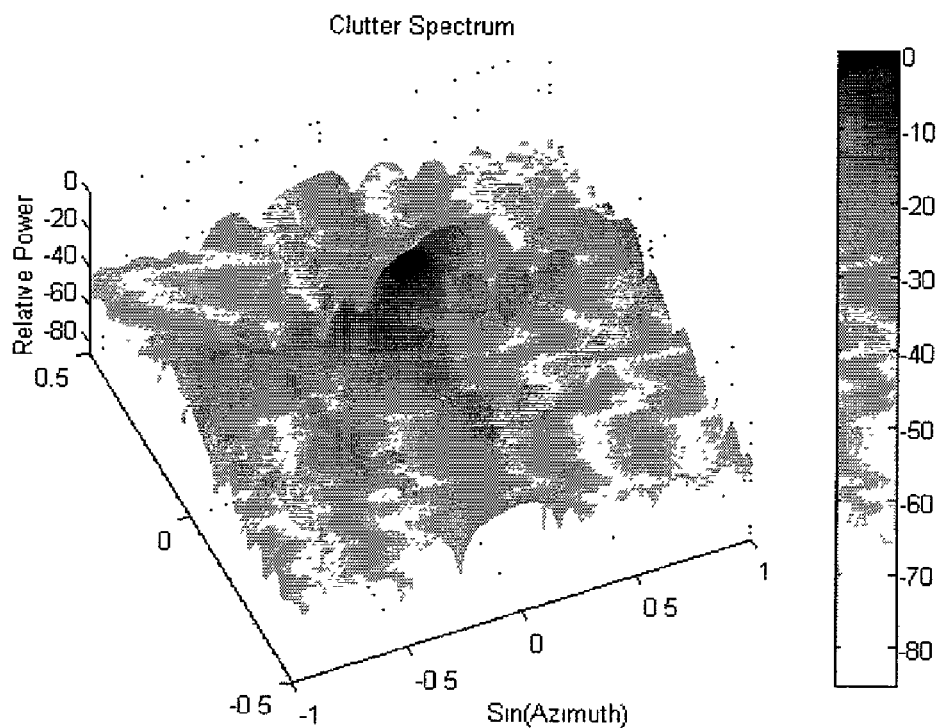

FIGS. 12(a) and 12(b) illustrate the clutter spectrum for actual airborne radar data using a linear array at L-band. The STAP-configured, multichannel radar and data collection system used to collect the data is termed MCARM. Data was collected during a flight. For MCARM STAP data processing shown here, N=11 elements and M=13 pulses were used such that full processor rank=143. A target of opportunity was found embedded in the clutter data at range cell 299, approximately at 0° azimuth and +0.16 normalized Doppler frequency.

Figure 13A:
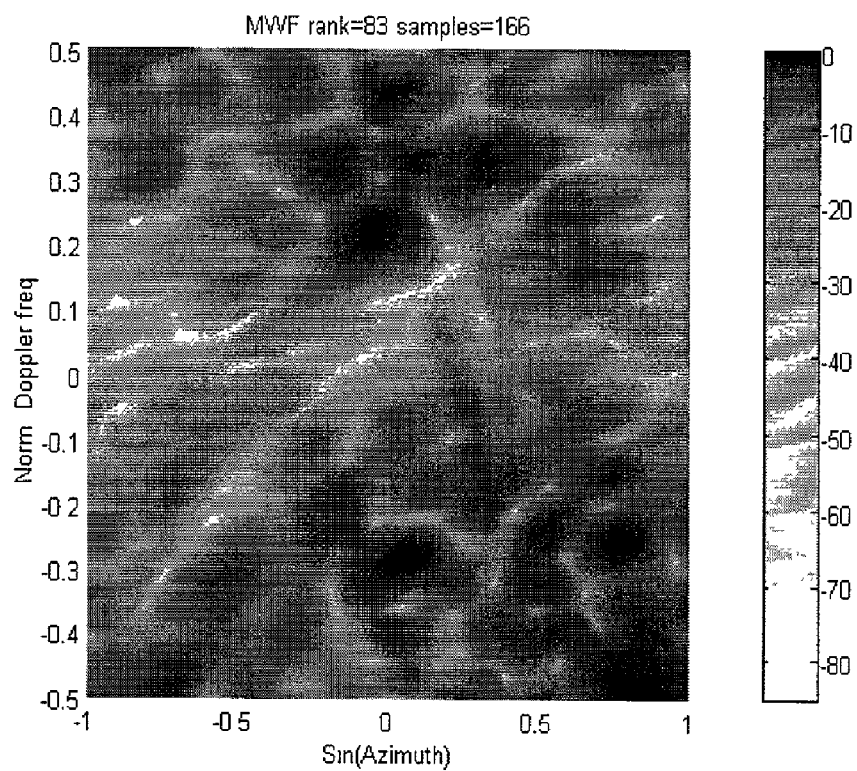
FIGS. 13a–b are graphs as in FIGS. 8a–b for an MWF having a different configuration and having input data statistics as shown in FIGS. 12a–b.
Figure 13B:
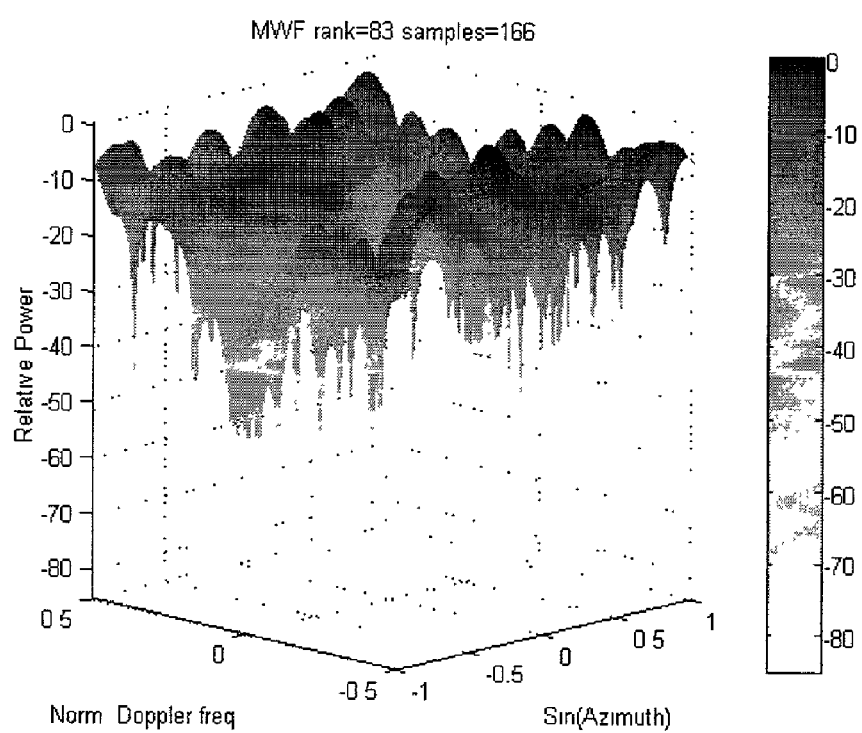
Figure 14A:
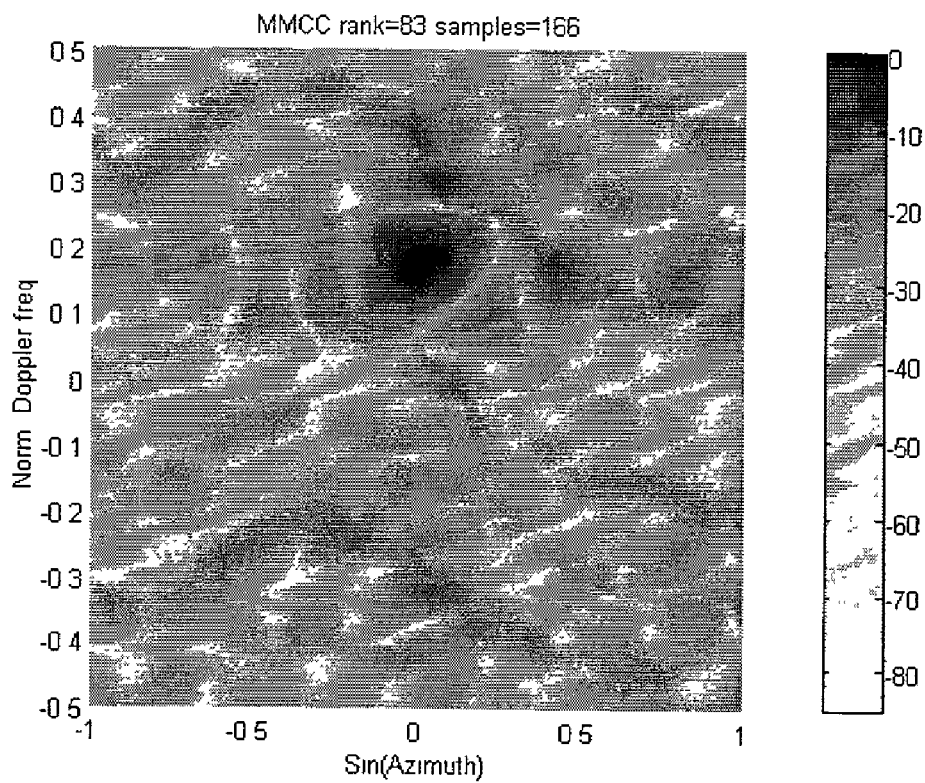
FIGS. 14a–b are graphs as in FIGS. 9a–b for an MMCC having a different configuration and having input data statistics as shown in FIGS. 12a–b in accordance with the invention.
Figure 14B:
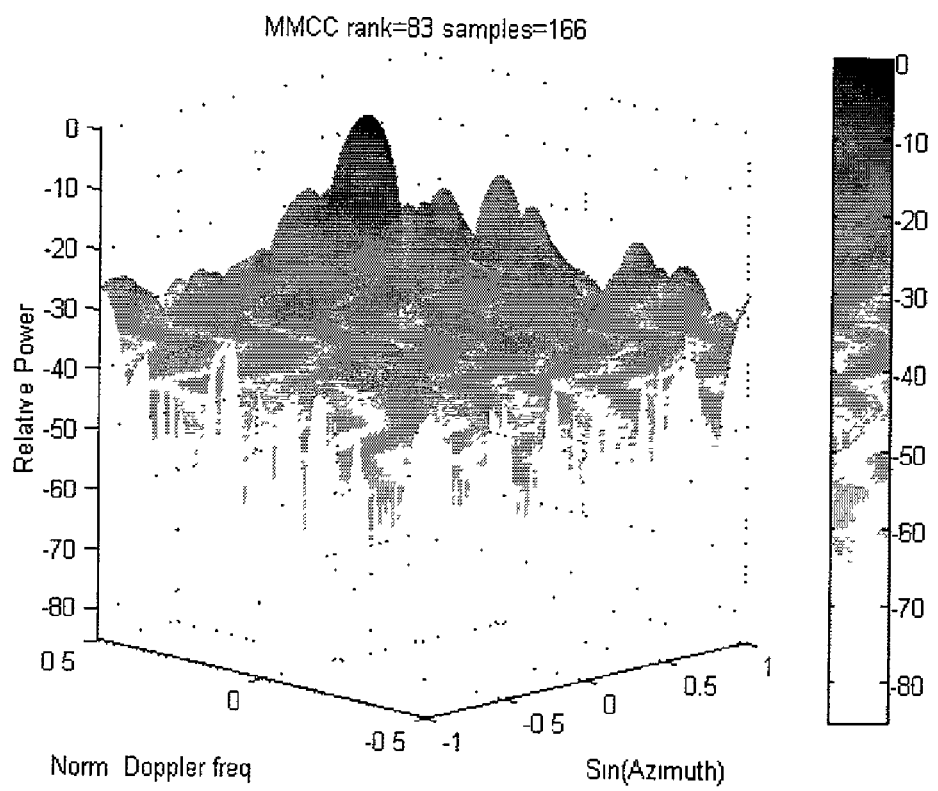

The adapted patterns formed by the MWF and MMCC processors for the MCARM data are shown in FIGS. 13–14, respectively, for a reduced rank r=83 and using K=2r=166 samples. Both processors keep high gain on the assumed target direction, and both null the clutter energy. However, the MMCC processor has an order 15 dB lower average adapted azimuth-Doppler sidelobe level compared to the MWF, as seen visually in the plot. These plots illustrate how, even with measured data, the low sidelobe level feature of the MMCC remains intact.

Figure 15:
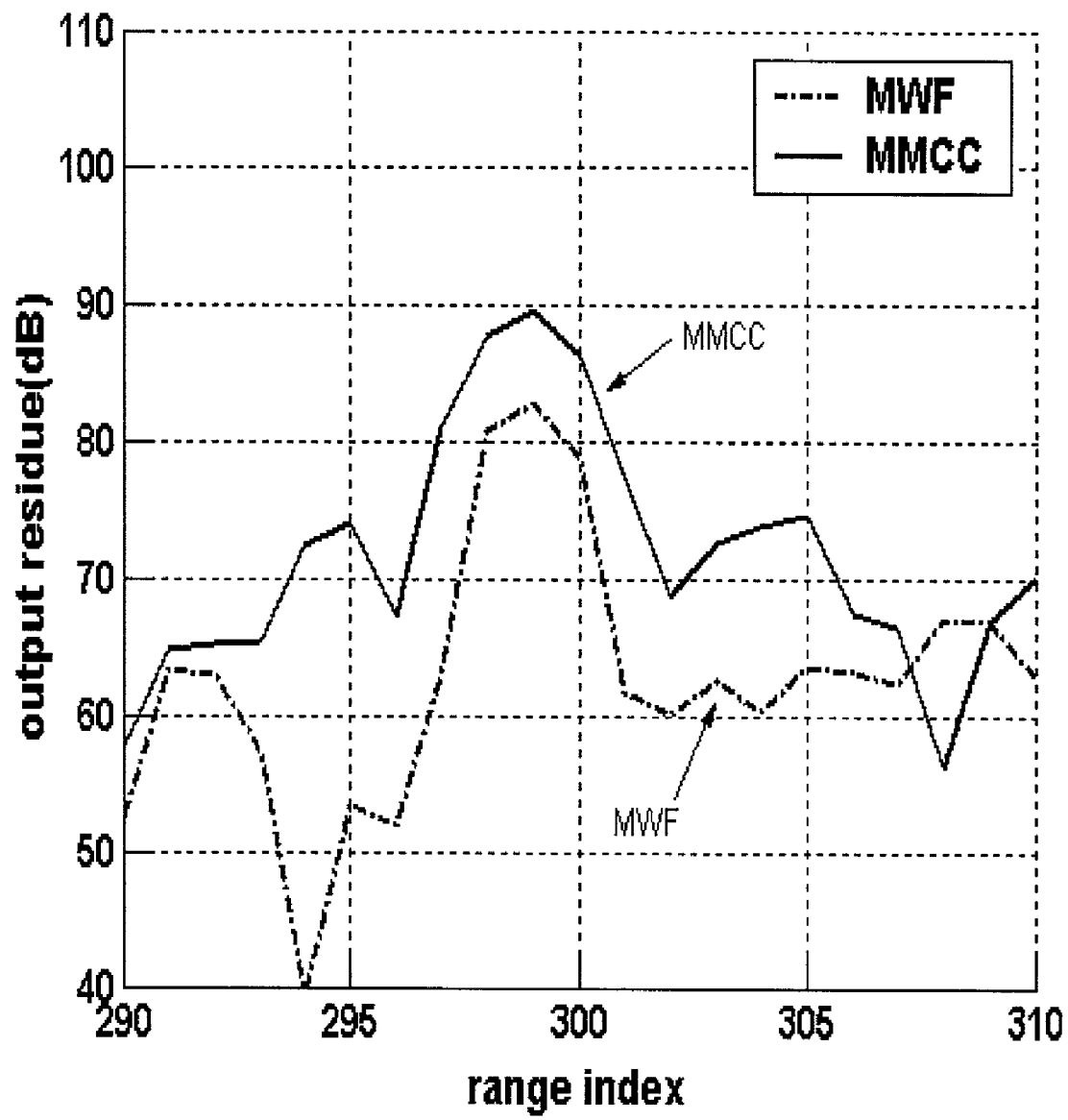
FIG. 15 is a comparison graph of a prior art system and an MMCC according to the invention.

FIG. 15 shows that the MCARM target of opportunity is clearly indicated by both the MWF and the MMCC processor outputs. The range cell under test and three guard cells on either side were excluded from the K=166 measured data training samples. Both the MWF and MMCC processors have a peak to peak-noise level ratio (i.e., instantaneous SINR) of approximately 14.5 dB. However, at the same time, the MMCC adapted azimuth-Doppler sidelobe levels are also generally significantly less than those of the MWF.

Accordingly, MMCC 10 exhibits significantly reduced adaptive azimuth-Doppler sidelobe levels not characteristic of prior art devices. This significantly aids sidelobe blanking and constant false alarm functions.

The invention has been described with reference to certain preferred embodiments thereof. It will be understood, however, that modification and variations are possible within the scope of the appended claims.

What is claimed is:

1. In a Multistage Weiner Filter having an analysis section and a synthesis section, the filter including:
a main input channel for receiving a main input signal;
an auxiliary input channel for receiving an auxiliary input signal; and
a processor;
the improvement comprising the processor includes an algorithm for generating a data adaptive linear transformation followed by computing an adaptive weighting $w_{med}$ of the data and for applying the computed adaptive weighting $w_{med}$ to a function of the main input signal and the auxiliary input signal to generate an output signal, and wherein the adaptive weighting $w_{med}$ comprises a sample median value of the real part of the ratio of a main input weight training data signal to an auxiliary input weight training data signal.

2. A Multistage Weiner Filter as in claim 1, wherein the adaptive weighting $w_{med}$ further comprises a sample median value of the imaginary part of the ratio of a main input weight training data signal to an auxiliary input weight training data signal.

3. A Multistage Weiner Filter as in claim 1, wherein the adaptive weighting $w_{med}$ is obtained from the equation:

$$w_{med} = \underset{k=1 \; to \; K}{MED}\left[\mathrm{real}\left(\frac{z(k)^*}{x(k)^*}\right)\right] + j\left\{\underset{k=1 \; to \; K}{MED}\left[\mathrm{imag}\left(\frac{z(k)^*}{x(k)^*}\right)\right]\right\}$$

where K is the number of weight training data samples, z is the main input signal, j is a unit imaginary number, and x is the auxiliary input signal.

4. A Multistage Weiner Filter as in claim 3, wherein the output signal, r, is obtained from the equation:

$$r = z - w^*_{med} x.$$

5. A Multistage Weiner Filter as in claim 4, wherein the processor includes a reduced rank truncation to decrease training data requirements and reduce processing time.

6. In a Multistage Weiner Filter for receiving a plurality of input signals corresponding to a common target signal and for sequentially decorrelating the input signals to cancel the correlated noise components therefrom, the filter having an analysis section and a synthesis section, and the filter further including:
a data adaptive linear transformation to apply to an input data vector;
a plurality of building blocks arranged in a cascaded configuration for sequentially decorrelating each of the input signals from each other of the input signals to thereby yield a single filtered output signal;
wherein each building block includes:
a local main input channel which receives a local main input signal,
a local auxiliary input channel which receives a local auxiliary input signal, and
a processor;
the improvement comprising the processor includes an algorithm for calculating an adaptive weighting $w_{med}$, and
generating a local output signal, utilizing the adaptive weighting $w_{med}$.

7. A Multistage Weiner Filter as in claim 6, wherein the adaptive weighting $w_{med}$ comprises: a sample median value of the real part of the ratio of a main input weight training data signal to an auxiliary input weight training data signal, and a sample median value of the imaginary part of the ratio of a main input weight training data signal to an auxiliary input weight training data signal.

8. A Multistage Weiner Filter as in claim 6, wherein each building block supplies the local output signal to a local output channel.

9. A Multistage Weiner Filter as in claim 6, wherein the adaptive weighting $w_{med}$ is obtained from the equation:

$$w_{med} = \underset{k=1 \; to \; K}{MED}\left[\mathrm{real}\left(\frac{z(k)^*}{x(k)^*}\right)\right] + j\left\{\underset{k=1 \; to \; K}{MED}\left[\mathrm{imag}\left(\frac{z(k)^*}{x(k)^*}\right)\right]\right\}$$

where K is the number of weight training data samples, z is the local main input signal, j is a unit imaginary number, and x is the local auxiliary input signal; and
the local output signal, r, from each building block is obtained from the equation:

$$r = z - w^*_{med} x.$$

10. A Multistage Weiner Filter as in claim 9, wherein the processor includes a reduced rank truncation to decrease training data requirements and reduce processing time.

11. An adaptive signal processing method, comprising the steps of:
receiving a plurality of input signals corresponding to a common target signal:
transforming the input signals to a data stream;
applying the data stream to a steering vector to commence processing with non-adaptive calculations by forming an initial estimate of the desired signal;
isolating the rest of the data by applying the transform $x_0(k) = B\,x(k)$, where B is a blocking matrix for finding a projection of the data orthogonal to the steering vector:
applying the initial data and the orthogonal projection of the data to at least one adaptive stage processor, said applying including:
determining the projection of the data in the direction most correlated with the desired signal;
determining the orthogonal projection to the direction most correlated with the desired signal;
applying said projections to the data;
inputting the input signals into a plurality of building blocks arranged in a cascade configuration for sequentially decorrelating each of the input signals from each other of the input signals;

in each building block, calculating an adaptive weighting $w_{med}$ and generating a local output signal, utilizing the adaptive weighting $w_{med}$; and generating a single filtered output signal.

12. An adaptive signal processing method as in claim 11, wherein the adaptive weighting $w_{med}$ from each building block is obtained by calculating a sample median value of the real part of a ratio of a main input weight training data signal to an auxiliary input weight training data signal and calculating a sample median value of the imaginary part of the ratio of a main input weight training data signal to an auxiliary input weight training data signal.

13. An adaptive signal processing method as in claim 11, wherein in each building block the adaptive weighting $w_{med}$ is obtained by calculating a sample median value of the real part of the ratio of a main input weight training data signal to an auxiliary input weight training data signal.

14. An adaptive signal processing method as in claim 11, wherein the adaptive weighting $w_{med}$ in each building block is obtained by calculating a sample median value of the imaginary part of a ratio of a main input weight training data signal to an auxiliary input weight training data signal.

15. An adaptive signal processing method as claimed in claim 11, wherein the adaptive weighting $w_{med}$ in each building block is obtained from the equation:

$$w_{med} = \underset{k=1 \text{ to } K}{MED}\left[\text{real}\left(\frac{z(k)^*}{x(k)^*}\right)\right] + j\left\{\underset{k=1 \text{ to } K}{MED}\left[\text{imag}\left(\frac{z(k)^*}{x(k)^*}\right)\right]\right\}$$

where K is the number of weight training data samples, z is the local main input signal, j is the unit imaginary vector, and x is the local auxiliary input signal.

16. An adaptive signal processing method as claimed in claim 15, wherein the local output signal, r, in each building block is obtained from the equation:

$$r = z - w^*_{med} x.$$

17. An adaptive signal processing method as claimed in claim 16, wherein the processor includes a reduced rank truncation to decrease training data requirements and reduce processing time.

18. A multistage median cascaded canceller, comprising:
a means for receiving a plurality of input signals corresponding to the same target signal;
a means for transforming the input signals to a data stream;
a means for applying the data stream to a steering vector to commence processing with non-adaptive calculations by forming an initial estimate of the desired signal;
a means for isolating the rest of the data by applying the transform $x_0(k)=B\ x(k)$, where B is a blocking matrix for finding a projection of the data orthogonal to the steering vector;
a means of determining and applying a data adaptive linear transformation via a cascade of orthogonal subspace projections to create an efficient input data transformation;
a means for applying the initial data and the orthogonal projection of the data to at least one adaptive stage processor, said adaptive stage processor including a plurality of building blocks arranged in a cascade configuration for sequentially decorrelating each of the input signals from each other of the input signals; and
a means for generating a single filtered output signal; and wherein each building block includes a means for receiving a local main input signal, a means for receiving a local auxiliary input signal, and a processing means for calculating an adaptive weighting $w_{med}$ and generating a local output signal, utilizing the adaptive weighting $w_{med}$.

19. A multistage median cascaded canceller as in claim 18, wherein the adaptive weighting $w_{med}$ comprises: a sample median value of the real part of a ratio of a main input weight training data signal to an auxiliary input weight training data signal, and a sample median value of the imaginary part of the ratio of a main input weight training data signal to an auxiliary input weight training data signal.

20. A multistage median cascaded canceller as in claim 18, wherein the adaptive weighting $w_{med}$ comprises a sample median value of the real part of a ratio of a main input weight training data signal to an auxiliary input weight training data signal.

21. A multistage median cascaded canceller as in claim 18, wherein the adaptive weighting $w_{med}$ in each building block is obtained from the equation:

$$w_{med} = \underset{k=1 \text{ to } K}{MED}\left[\text{real}\left(\frac{z(k)^*}{x(k)^*}\right)\right] + j\left\{\underset{k=1 \text{ to } K}{MED}\left[\text{imag}\left(\frac{z(k)^*}{x(k)^*}\right)\right]\right\},$$

where K is the number of weight training data samples, z is the local main input signal, j is the unit imaginary vector, and x is the local auxiliary input signal; and generates the local output signal, r, by solving the equation:

$$r = z - w^*_{med} x.$$

22. A multistage median cascaded canceller as in claim 21, wherein the processor includes a reduced rank truncation to decrease training data requirements and reduce processing time.

23. A multistage median cascaded canceller for receiving a plurality input signals corresponding to a common target signal and for sequentially decorrelating the input signals to cancel the correlated noise components therefrom, comprising:
an analysis section;
a synthesis section;
a processor configured for:
applying the data stream to a steering vector to commence processing with non-adaptive calculations by forming an initial estimate of the desired signal;
isolating the rest of the data by applying the transform $x_0(k)=Bx(k)$, where B is a blocking matrix for finding a projection of the data orthogonal to the steering vector;
applying the initial data and the orthogonal projection of the data to at least one adaptive stage processor, said adaptive stage processor including a plurality of building blocks arranged in a cascade configuration having N input channels and N-1 rows of building blocks, for sequentially decorrelating each of the input signals from each other of the input signals to thereby yield a single filtered output signal;
wherein each building block includes:
a local main input channel which receives a local main input signal,
a local auxiliary input channel which receives a local auxiliary input signal, and wherein the processor is further configured to calculate an adaptive weighting $w_{med}$ and generate a local output signal, utilizing the adaptive weighting $w_{med}$; and wherein an end building block supplies the local output signal to a separate local output channel for follow on processing.

24. A multistage median cascaded canceller as in claim 23, wherein the Nth input channel is supplied for follow on processing.

25. A multistage median cascaded canceller as in claim 23, wherein said adaptive weighting $w_{med}$ comprises: a sample median value of the real part of a ratio of a main input weight training data signal to an auxiliary input weight training data signal, and a sample median value of the imaginary part of the ratio of a main input weight training data signal to an auxiliary input weight training data signal.

26. A multistage median cascaded canceller as in claim 23, wherein said adaptive weighting $w_{med}$ comprises a sample median value of the real part of a ratio of a main input weight training data signal to an auxiliary input weight training data signal.

27. A multistage median cascaded canceller as in claim 23, wherein said adaptive weighting $w_{med}$ is obtained from the equation:

$$w_{med} = \underset{k=1 \ to \ K}{MED}\left[real\left(\frac{z(k)^*}{x(k)^*}\right)\right] + j\left\{\underset{k=1 \ to \ K}{MED}\left[imag\left(\frac{z(k)^*}{x(k)^*}\right)\right]\right\}$$

where K is the number of weight training data samples, z is the local main input signal, j is the unit imaginary vector, and x is the local auxiliary input signal; and the local output signal r is obtained from the equation:

$$r = z - w^*_{med} x.$$

28. A multistage median cascaded canceller as in claim 27, wherein the processor includes a reduced rank truncation to decrease training data requirements and reduce processing time.

* * * * *